US006485001B1

(12) United States Patent
Mallery et al.

(10) Patent No.: US 6,485,001 B1
(45) Date of Patent: Nov. 26, 2002

(54) ELECTRIC LIFTS FOR AUTOMOTIVE SERVICE

(76) Inventors: Perry Mallery, 1407½ N. Pinal, Casa Grande, AZ (US) 85222; Roger W. Howe, P.O. Box 444, Arizona City, AZ (US) 85223

( * ) Notice: Subject to any disclaimer, the term of this patent is extended or adjusted under 35 U.S.C. 154(b) by 47 days.

(21) Appl. No.: 09/756,560

(22) Filed: Jan. 8, 2001

(51) Int. Cl.[7] .................................................. B60P 1/48

(52) U.S. Cl. ........................ 254/8 B; 254/4 B; 254/124

(58) Field of Search ................................ 254/126, 4 B, 254/8 B, 139, 139.1, 143, 8 R, 4 R, 2 R, 2 B, 122, 124

(56) References Cited

U.S. PATENT DOCUMENTS

| | | | | |
|---|---|---|---|---|
| 3,811,576 A | | 5/1974 | Fagen | |
| 4,090,625 A | | 5/1978 | Walters | |
| 4,190,233 A | * | 2/1980 | Godfrey | 254/4 B |
| 4,484,366 A | | 11/1984 | Koontz | |
| 4,652,204 A | | 3/1987 | Arnett | |
| 4,749,324 A | | 6/1988 | Rulison | |
| 5,011,364 A | * | 4/1991 | Anderson | 254/124 |
| 5,186,282 A | * | 2/1993 | Everhard et al. | 187/8.59 |

* cited by examiner

*Primary Examiner*—Lee Wilson

(74) *Attorney, Agent, or Firm*—Parsons & Goltry; Robert A. Parsons; Michael W. Goltry

(57) ABSTRACT

An electric lift including a base, an upright boom support extending from the base and terminating in an end, and an elongated boom having a first end pivotally coupled to the end of the boom support and a second end. An electric power apparatus is coupled between the base and the lifting member for incrementally moving the lifting member between a lowered position and a raised position. A remote control is coupled to the electric power apparatus for controlling the operation thereof.

16 Claims, 4 Drawing Sheets

ELECTRIC LIFTS FOR AUTOMOTIVE SERVICE

FIELD OF THE INVENTION

This invention relates to lifts for use in automotive service.

More particularly, the present invention relates to lifts for lifting automotive engines and transmissions.

In a further and more specific aspect, the instant invention concerns electric lifts for lifting automotive engines and transmissions during automotive service.

BACKGROUND OF THE INVENTION

At the present time, because of the tremendous number of automotive vehicles (automobiles, trucks, vans, utility vehicles, etc.), there are a large variety of machines for aiding mechanics in servicing these vehicles. For example, in many instances it is necessary to lift the engine or motor (e.g. replacing the engine, replacing engine mounts, working on the drive chain, etc.). Also, in many instances it is necessary to lift the transmission. In either of these functions, the prior art devices are hydraulic lifts or jacks that are difficult to operate and control. For example, while it is generally necessary to move engines and transmissions relatively long distances for removal and the like, in many instances during any of the service operations it is necessary to move the engine or transmission a small fraction of an inch for alignment and the like. Thus the range and amount of movement can be critical. In prior art hydraulic lifts, if the device has a relatively long range it generally moves too fast to allow small movements, that is the controls are insensitive to very small movements.

It would be highly advantageous, therefore, to remedy the foregoing and other deficiencies inherent in the prior art.

Accordingly, it is an object of the present invention to provide new and improved electric lifts for automotive service.

Another object of the invention is to provide new and improved electric lifts for automotive service which are very sensitive to small or short movements.

And another object of the invention is to provide new and improved electric lifts for automotive service which are easy and convenient to use.

SUMMARY OF THE INVENTION

Briefly, to achieve the desired objects of the present invention in accordance with a preferred embodiment thereof, provided is an electric lift including a base and a lifting member. An electric power apparatus is coupled between the base and the lifting member for incrementally moving the lifting member between a lowered position and a raised position. A remote control is coupled to the electric power apparatus for controlling the operation thereof.

In a particular aspect of the present invention, electric power apparatus includes an electric motor, a gear box coupled to the electric motor, and a housing carrying an elongated worm gear. The elongated worm gear has a first end coupled to the gear box and a second end coupled to the lifting member.

In a more specific aspect the electric lift includes an upright boom support extending from the base and terminating in an end, and the lifting member includes an elongated boom having a first end coupled to the end of the boom support and a second end. The lifting member can also include a platform having a lower surface coupled to the second end of the worm gear and an upper surface.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
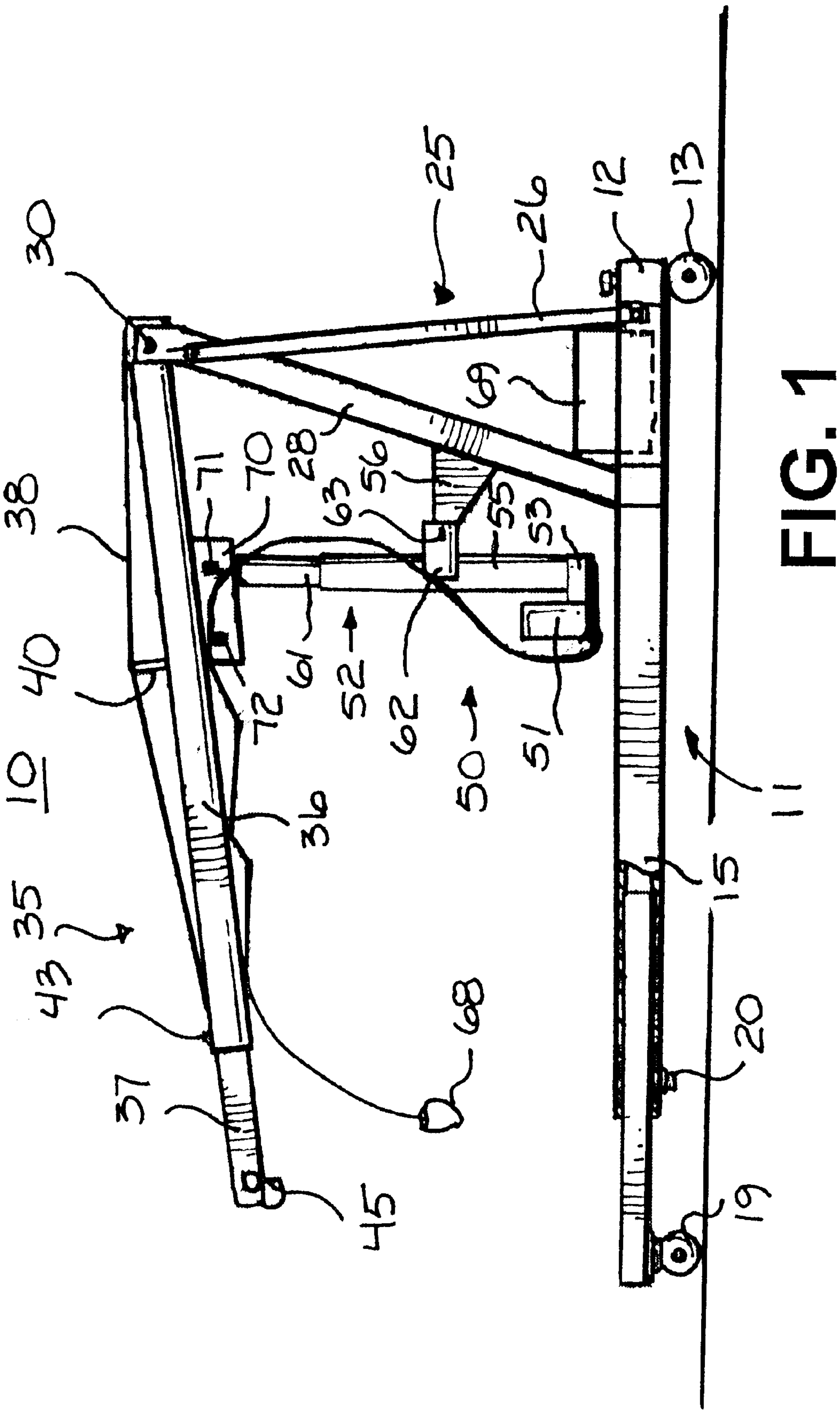
FIG. 1 is a view in side elevation of an electric lift for automotive service in accordance with the present invention.
Figure 2:
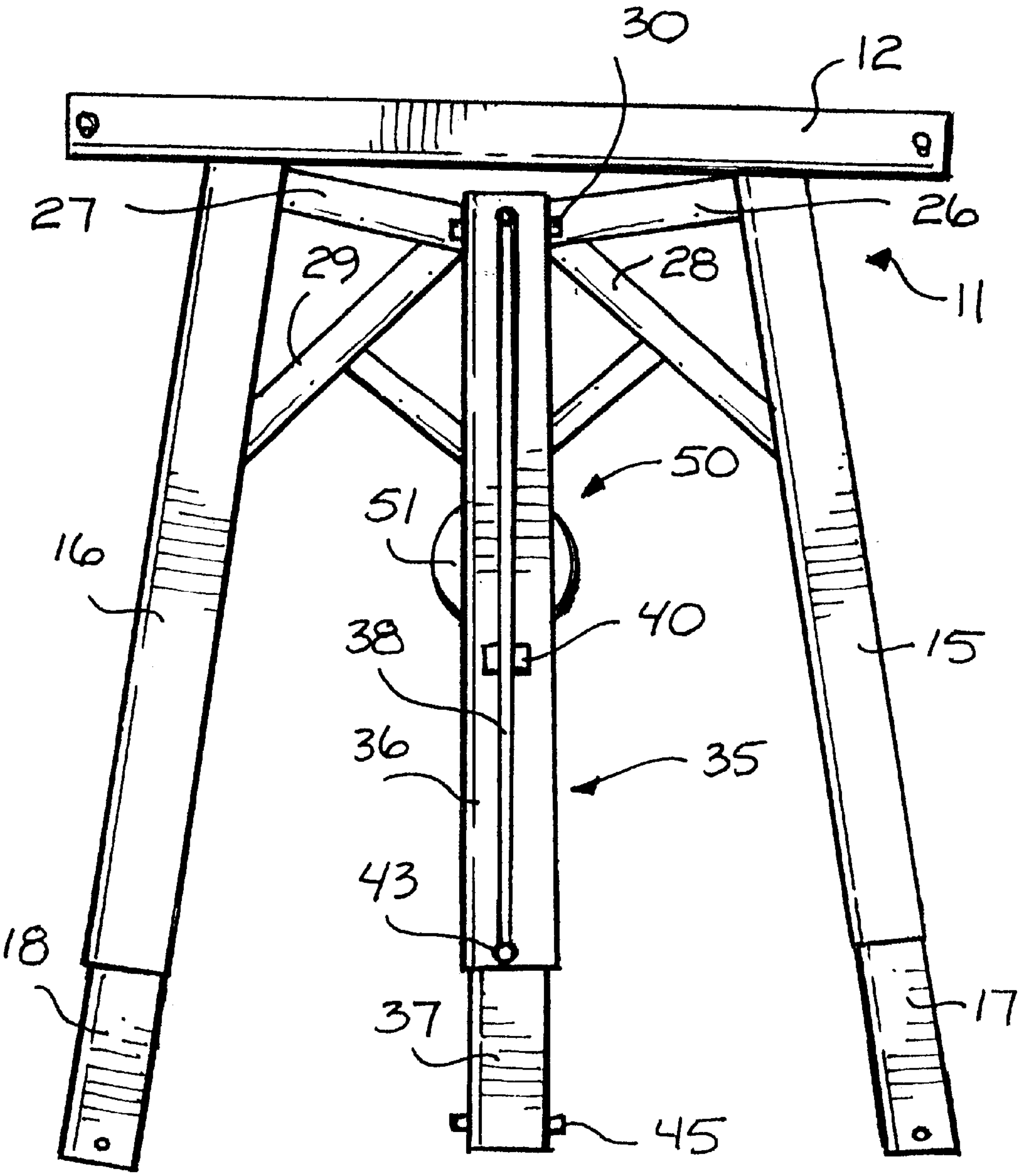
FIG. 2 is a view in top plan of the electric lift of FIG. 1.

Turning now to the drawings in which like reference characters indicate corresponding elements throughout the several views, attention is first directed to FIGS. 1 and 2 which illustrate an embodiment of an electric lift 10 for use in automotive servicing and the like in accordance with the present invention. The specific embodiment of lift 10 illustrated and described is for exemplary purposes only and many minor modifications may be made without diverging from the scope of the invention. Further, while lift 10 is described in conjunction with automotive servicing, it will be understood that many other uses will occur to those skilled in the art after reading the present disclosure.

Lift 10 includes a base 11, which in this specific embodiment is constructed with an elongated transverse member 12 having transporting wheels 13 pivotally affixed to the underside thereof adjacent each end. Two spaced apart, generally longitudinal members 15 and 16 each have one end fixedly attached to transverse member 12 and an opposite end extending longitudinally from member 12 and radiating slightly outwardly from each other to add stability to lift 10. Longitudinal members 15 and 16 include extendible elongated portions 17 and 18, respectively, that are telescoped inside of longitudinal members 15 and 16 for extending the length of base 11 in some applications (to be explained presently). Bolts 20 extend through each longitudinal member 15 and 16 and engage extendible elongated portions 17 and 18 to fixedly lock them in a desired position. The outer end of each of the extendible elongated portions 17 and 18 has a transporting wheel 19 pivotally attached to the underside thereof.

An upright boom support 25 is fixedly attached to base 11. Support 25 includes a pair of substantially vertical supports 26 and 27 which are attached at a lower end to longitudinal members 15 and 16, respectively, adjacent transverse member 12. A second pair of supports 28 and 29, which are attached at a lower end to longitudinal members 15 and 16, respectively, at positions spaced forwardly from transverse member 12, angle slightly rearwardly so that the upper ends of supports 26 and 28 and the upper ends of supports 27 and 29 are affixed together by a common pivot pin 30.

An elongated extendible boom 35 extends outwardly from upright boom support 25 to approximately the outer or forward extremities of base 11. Boom 35 includes an outer elongated cylindrical member 36 and an elongated telescoping member 37 nestingly positioned in cylindrical member 36. Pivot pin 30 is pivotally engaged through one end of member 36 so that the rear end of boom 35 is pivotally held in place by supports 26, 27, 28, and 29 and the other end is cantilevered forwardly therefrom. A cable 38 has one end attached to the rear or pivotally attached end of member 36 and the other end attached to the forward end of member 36. Tension is applied to the forward end of cable 38 and, therefore, to the forward end of member 36 by means of a bridge 40 positioned between cable 38 and member 36 approximately midway between the ends thereof. A bolt 43 extends through cylindrical member 36 and engages telescoping member 37 to fixedly lock telescoping member 37 in a desired position. Some type of engaging means 45, such as a hook, bolt, clevis, or the like, is affixed to the outer or forward end of telescoping member 37 so that chains cables, etc. can be conveniently attached thereto.

Figure 3:
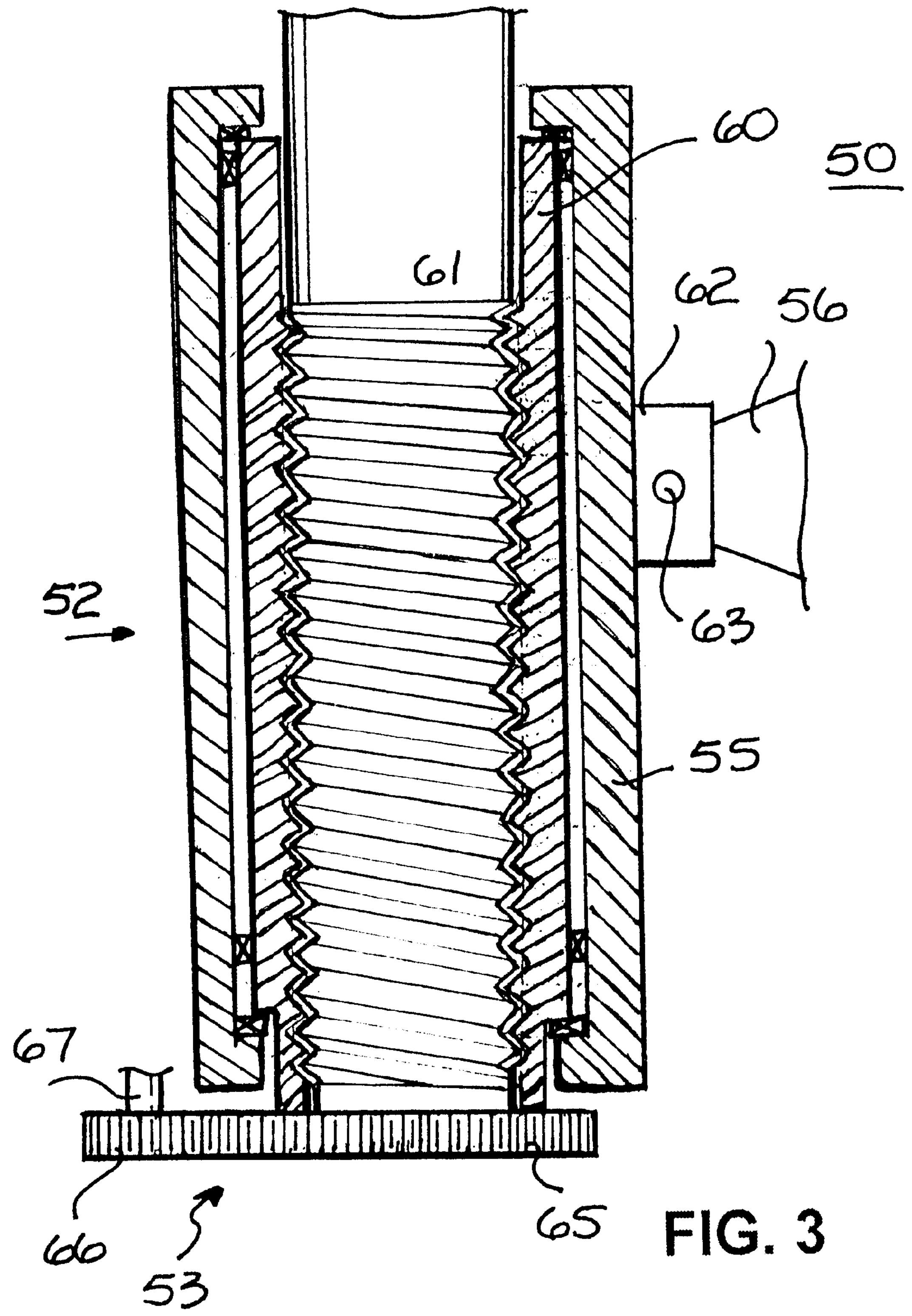
FIG. 3 is an enlarged view, portions thereof broken away and shown in section, of a portion of the electric lift of FIG. 1.

Electric power apparatus 50 is attached between upright boom support 25 and boom 35 to provide vertical movements of the outer or forward end, (including engaging means 45) of boom 35. Apparatus 50 includes an electric motor 51 rotatably attached to an elongated worm gear 52 by means of a gear box 53. An outer housing 55 of worm gear 52 is pivotally affixed to brackets 56, which are fixed to supports 28 and 29. Referring in addition to FIG. 3, an enlarged detailed view of apparatus 50 is illustrated. As can be seen more clearly in FIG. 3, housing 55 has a generally cylindrically shaped opening therethrough with a driving cylinder 60 rotatably mounted therein for rotary but no vertical movement. At least a portion of the inner diameter of driving cylinder 60 is threaded. An elongated rod 61 having mating threads in the outer periphery thereof is threadedly engaged in driving cylinder 60 for vertical movements. Housing 55 has a collar 62 fixedly attached to an outer surface thereof and pivotally attached by a pivot pin 63 to brackets 56 to allow pivotal movements of worm gear 52 about horizontal pivot pin 63 while preventing vertical movements of housing 55.

The lower end of driving cylinder 60 is affixed to a gear 65 which meshes with a drive gear 66 affixed to a shaft 67 of electric motor 51. Thus, by energizing motor 51, shaft 67, gear 66, and gear 65 are rotated to cause driving cylinder 60 of worm gear 52 to rotate about its longitudinal axis. Since rod 61 is threadedly engaged in driving cylinder 60, as driving cylinder 60 is rotated by motor 51 rod 61 moves vertically upward or downward, depending upon the direction of rotation of motor 51 and driving cylinder 60. A remote control 68 is attached to motor 51 for controlling motor 51 while positioned at or near an object (engine, etc.) being raised or lowered. Also, and electric storage battery 69 is provided to power electric motor 51 in situations and/or occasions where electricity is not available. In this embodiment electric motor 51 is the type that operates from a 12 volt DC supply but other types of electric motors can be utilized if portability is not an option. Here it will be understood by those skilled in the art that other gearing or driving means can be devised to provide vertical movement of a portion of electric power apparatus 50 and boom 35 in response to rotary movement of electric motor 51 and the disclosed apparatus is simply for explanatory purposes.

The upper end of rod 61 is pivotally attached to cylindrical member 36 of boom 35 by means of a bracket 70 which extends along a midsection of cylindrical member 36. Bracket 70 has a plurality of longitudinally spaced apart holes (two in the present example) designated 71 and 72 designed to receive a pivot pin therethrough for the attachment of the upper end of rod 61. Here it should be noted that the various holes in bracket 70 change the position and angle at which electric power apparatus 50 is engaged with boom 35, resulting in greater lift potential using the hole or holes (e.g. hole 72) nearest the forward or outer end of boom 35 and greater speed or amount of movement using the hole or holes (e.g. hole 71) nearest the rearward or mounted end of boom 35.

In a specific example of lift 10, boom 35 is approximately 53 inches long in the retracted position and approximately 106 inches long in the fully extended position. It should be understood, of course, that any extension between the retracted and fully extended positions is possible. Also, it should be understood that members 17 and 18 are generally extended the same amount as boom 35 for the maximum safety and stability. With electric power apparatus 50 engaged in hole 71 of bracket 70 and boom 35 fully extended, lift 10 is capable of moving 77 inches from a lower position of approximately 25 inches to a raised position of approximately 102 inches. Also, in this orientation lift 10 is capable of safely lifting approximately 410 pounds. With electric power apparatus 50 engaged in hole 71 of bracket 70 and boom 35 retracted, lift 10 is capable of moving 47 inches from a lower position of approximately 38 inches to a raised position of approximately 85 inches. Also, in this orientation lift 10 is capable of safely lifting approximately 550 pounds. With electric power apparatus 50 engaged in hole 72 of bracket 70 and boom 35 fully extended, lift 10 is capable of safely lifting approximately 650 pounds and with electric power apparatus 50 engaged in hole 72 of bracket 70 and boom 35 retracted, lift 10 is capable of safely lifting approximately 800 pounds.

Lift 10 can perform very small and very accurate movements because motor 51 can be geared to produce as little as a fraction of a turn of driving cylinder 60 when control 68 supplies a pulse of electricity to motor 51 and, thus, as little as a fraction of a centimeter of vertical movement of rod 61. Further, through adjustments described above lift 10 is capable of either long distance movements, large weight movements, or a compromise of both. Thus, an electric lift for use in automotive servicing is disclosed which is extremely versatile and sensitive to perform very accurate movements.

Figure 4:
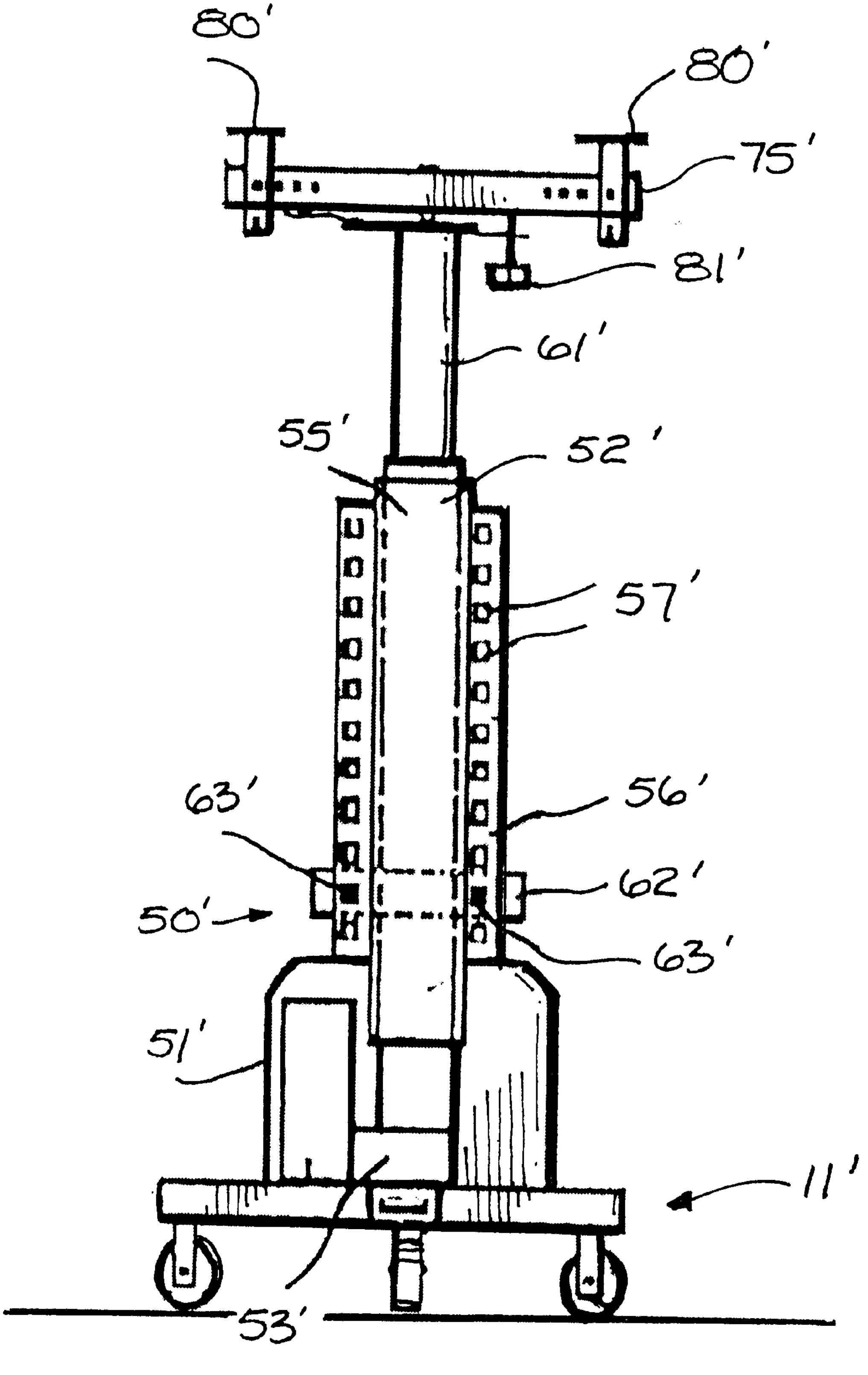
FIG. 4 is a view in side elevation of another electric lift for automotive service in accordance with the present invention.

Turning now to FIG. 4, another embodiment of an electric lift 10' for use in automotive servicing and the like in accordance with the present invention is illustrated. In this embodiment components similar to those in the embodiment described above are designated with similar numbers and all numbers have a prime added to indicate the different embodiment. Lift 10' includes a wheeled base 11' with electric power apparatus 50' mounted thereon to provide upward force on a transmission or engine engaging platform 75'. Apparatus 50' includes an electric motor 51' rotatably attached to an elongated worm gear 52' by means of a gear box 53'. Here it should be noted that apparatus 50' operates essentially the same as apparatus 50 described above and may, in fact, be apparatus 50 with some slight modifications.

As described above, an outer housing 55' has a generally cylindrically shaped opening therethrough with a driving cylinder rotatably mounted therein for rotary but no vertical movement. At least a portion of the inner diameter of the driving cylinder is threaded and an elongated rod 61' having mating threads in the outer periphery thereof is threadedly engaged in the driving cylinder for vertical movements. Housing 55' has a collar 62' fixedly attached to an outer surface thereof and adjustably attached by pins 63' to a pair of elongated brackets 56' that are fixedly mounted, vertically on wheeled base 11'. Brackets 56' each have a plurality of vertically spaced apart height range adjustment holes 57' therethrough for receiving pins 63'. Collar 62' and brackets 56' are provided to position rod 61' and platform 75' at a convenient starting distance above base 11' and, thus, above the ground while preventing vertical movements of housing 55'.

In this embodiment, the actual travel of rod 61' and, therefore, of platform 75' is 18 inches. Through proper use of height range adjustment holes 57', rod 61' and platform 75' have a range of movement of 30 inches. Further, lift 10' has a weight capacity of up to 1500 pounds. Also, platform 75' has a plurality of bolts or component receiving lugs positioned in the upper surface thereof for more easily receiving and conforming to the different shapes of different components (e.g. various transmissions, engines, etc.). Further a tilt control 81' is positioned to bear against a lower surface of platform 75' and provide a desired amount of tilt to more easily accommodate different shapes and positions. Thus, it can be seen by those skilled in the art that electric power apparatus 50 of lift 10 (described above) can easily be removed and placed in lift 10' or some minor additional equipment and slightly altered components can be included in lift 10 so that it can quickly and easily be converted into lift 10'.

Lift 10' can perform very small and very accurate movements for the reasons set forth in conjunction with lift 10. Further, through adjustments described above lift 10' is capable of relatively long distance movements. Thus, electric lifts for use in automotive servicing (e.g. 10 and 10') are disclosed which are extremely versatile and sensitive to perform very accurate movements. Accordingly, new and improved electric lifts for automotive service have been disclosed which are very sensitive to small or short movements. Further, the new and improved electric lifts for automotive service are easy and convenient to use.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. An electric lift comprising:

a base;

an upright boom support extending from the base and terminating in an end, and a lifting member including an elongated boom having a first end coupled to the end of the boom support and a second end;

an electric power apparatus coupled between the upright boom support and the elongated boom for incrementally moving the lifting member between a lowered position and a raised position, the electric power apparatus includes an electric motor, a gear box coupled to the electric motor, and a housing carrying an elongated worm gear, the elongated worm gear having a first end coupled to the gear box and a second end coupled to the lifting member; and a remote control coupled to the electric power apparatus for controlling the operation thereof.

2. The electric lift as claimed in claim 1 wherein the housing of the electric power apparatus is pivotally coupled to the boom support by a first bracket and the second end of the worm gear is coupled to the elongated boom by a second bracket.

3. The electric lift as claimed in claim 2 wherein the second bracket includes a plurality of apertures to provide adjustable attachment of the second end of the worm gear.

4. An electric lift comprising:

a base;

a lifting member;

an electric power apparatus coupled between the base and the lifting member for incrementally moving the lifting member between a lowered position and a raised position, the electric power apparatus includes, an electric motor, a gear box coupled to the electric motor, and a housing carrying an elongated worm gear, the elongated worm gear having a first end coupled to the gear box and a second end coupled to the lifting member;

a remote control coupled to the electric power apparatus for controlling the operation thereof; and wherein the lifting member includes a platform having a lower surface coupled to the second end of the worm gear and an upper surface.

5. The electric lift as claimed in claim 4 further including a tilt control positioned to bear against the lower surface of the platform to tilt the platform.

6. The electric lift as claimed in claim 4 wherein the base includes a storage compartment carrying a battery coupled to the electric motor.

7. An electric lift comprising:

a base;

an upright boom support extending from the base and terminating in an end;

an elongated boom having a first end pivotally coupled to the end of the boom support and a second end;

an electric power apparatus coupled between the base and the elongated boom for incrementally moving the elongated boom between a lowered position and a raised position, the electric power apparatus includes an electric motor, a gear box coupled to the electric motor, and a housing carrying an elongated worm gear, the elongated worm gear having a first end coupled to the gear box and a second end coupled to the elongated boom; and a remote control coupled to the electric power apparatus for controlling the operation thereof.

8. The electric lift as claimed in claim 7 wherein the electric power apparatus is coupled between the upright boom support and the elongated boom.

9. The electric lift as claimed in claim 8 wherein the housing of the electric power apparatus is pivotally coupled to the boom support by a first bracket and the second end of the worm gear is coupled to the elongated boom by a second bracket.

10. The electric lift as claimed in claim 9 wherein the second bracket includes a plurality of apertures to provide adjustable attachment of the second end of the worm gear.

11. An electric lift comprising:

a base;

an upright boom support extending from the base and terminating in an end;

an elongated boom having a first end pivotally coupled to the end of the boom support and a second end;

an electric motor;

a gear box coupled to the electric motor;

a housing pivotally coupled to the upright boom support and carrying an elongated worm gear, the elongated worm gear having a first end coupled to the gear box and a second end coupled to the elongated boom for incrementally moving the elongated boom between a lowered position and a raised position; and a remote control coupled to the electric motor for controlling the operation of the electric lift.

12. The electric lift as claimed in claim 11 wherein the second end of the worm gear is coupled to the elongated boom by a bracket having a plurality of apertures to provide adjustable attachment of the second end of the worm gear.

13. The electric lift as claimed in claim 12 further including a battery carried by the base and coupled to the electric motor.

14. The electric lift as claimed in claim 12 wherein the base includes a pair of spaced apart longitudinal members coupled proximate an end by a elongate transverse member.

15. The electric lift as claimed in claim 14 wherein each of the pair of longitudinal members includes an extendable elongate portion.

16. The electric lift as claimed in claim 11 wherein the elongated boom includes an outer cylindrical member having an end coupled to the upright boom support and an elongated telescoping members slideably received within an opposing end of the outer cylindrical member.

* * * * *